US012397540B2

(12) United States Patent
Vieth et al.

(10) Patent No.: US 12,397,540 B2
(45) Date of Patent: Aug. 26, 2025

(54) PRINTING SYSTEM

(71) Applicant: BOBST BIELEFELD GMBH, Bielefeld (DE)

(72) Inventors: Sascha Vieth, Jena (DE); Frank Rudolph, Versmold (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 0 days.

(21) Appl. No.: 18/250,403

(22) PCT Filed: Oct. 21, 2021

(86) PCT No.: PCT/EP2021/079250
§ 371 (c)(1),
(2) Date: Apr. 25, 2023

(87) PCT Pub. No.: WO2022/090056
PCT Pub. Date: May 5, 2022

(65) Prior Publication Data
US 2024/0001696 A1 Jan. 4, 2024

(30) Foreign Application Priority Data
Oct. 28, 2020 (EP) .................................... 20204282

(51) Int. Cl.
*B41F 31/00* (2006.01)
*B41F 31/02* (2006.01)
*B41F 33/00* (2006.01)

(52) U.S. Cl.
CPC ............ *B41F 31/005* (2013.01); *B41F 31/02* (2013.01); *B41F 33/00* (2013.01); *B41P 2233/30* (2013.01)

(58) Field of Classification Search
None
See application file for complete search history.

(56) References Cited

U.S. PATENT DOCUMENTS 6,947,175 B1 * 9/2005 Caruthers .......... G03G 15/5029 358/1.9
2002/0008724 A1 1/2002 Kubota et al.
(Continued)

FOREIGN PATENT DOCUMENTS

CN 1479675 A 3/2004
CN 101939167 A 1/2011
(Continued)

*Primary Examiner* — Joshua D Zimmerman
(74) *Attorney, Agent, or Firm* — Bookoff McAndrews, PLLC

(57) ABSTRACT

A printing system (10) is provided for printing on a material, comprising an ink formulation module (12) comprising at least one ink reservoir (14) and an ink adjustment system (16), a printing unit (18) for applying ink to the material, a sensor module (22) comprising at least one probe (24) for generating color measurement data, and a control module (25) being connected to the ink formulation module (12), the sensor module (22) and the printing unit (18). The color measurement data comprises at least one ink color value of the ink before being applied on the material by the printing unit (18). The control module (25) is configured to receive the color measurement data from the sensor module (22) and to transmit an ink adjustment request to the ink formulation module (12), wherein the ink formulation module (12) is configured to adjust the ink composition of the ink in the at least one ink reservoir (14) based on the ink adjustment request.

20 Claims, 3 Drawing Sheets

(56) References Cited

U.S. PATENT DOCUMENTS

| | | | | |
|---|---|---|---|---|
| 2003/0084805 | A1* | 5/2003 | Heller | B05C 1/0813 101/350.1 |
| 2007/0097175 | A1* | 5/2007 | Stelter | B41J 2/211 347/43 |
| 2014/0182467 | A1 | 7/2014 | Ihme et al. | |

FOREIGN PATENT DOCUMENTS

| | | | | | |
|---|---|---|---|---|---|
| CN | 105142913 | A | | 12/2015 | |
| CN | 106976314 | A | | 7/2017 | |
| CN | 110461611 | A | | 11/2019 | |
| DE | 2410753 | A | * | 9/1975 | B01F 15/0441 |
| DE | 2410753 | A1 | | 9/1975 | |
| EP | 1310833 | A2 | | 5/2003 | |
| JP | 2010094838 | A | * | 4/2010 | B01F 15/0441 |
| TW | 533137 | B | | 5/2003 | |
| TW | 558737 | B | | 10/2003 | |
| TW | 201217180 | A | | 5/2012 | |
| TW | 202017759 | A | | 5/2020 | |

* cited by examiner

PRINTING SYSTEM

CROSS-REFERENCE TO RELATED APPLICATION(S)

This application is a National Stage Application under 35 U.S.C. § 371 of International Application No. PCT/EP2021/079250, filed Oct. 21, 2021, which claims priority to European Application No. 20204282.6, filed on Oct. 28, 2020, the entireties of which are incorporated herein by reference.

The invention relates to a printing system for printing on a material.

The printing quality of a printed product is dependent on a multitude of parameters, including printing machine parameters, material parameters and ink-related parameters. The achieved print result is typically checked by well-trained personnel operating a printing machine, e.g. by taking sample prints. If the print result does not fulfill the desired quality, the multitude of parameters of the printing process must be adjusted, possibly resulting in extended downtimes of the printing machine.

To evaluate the printing quality, it is known to use sensors to measure the spectral wavelength distribution and the spectral intensity of the printed product and to compare these measured values to target values. Based on this comparison, an adjusted ink recipe can be provided. However, known systems able to provide an adjusted ink recipe are usually complex to operate, need manual handling by the personnel and/or require a multitude of operating steps including several iterations to achieve the desired printing result.

Further, known systems cannot consider the ink formulation, i.e. the liquid ink, produced based on the ink recipe, rendering the actually used inks in the printing process unknown. Accordingly, there is no means available to directly correlate the liquid ink formulation to the quality of the printed product.

The object of the invention is to provide a printing system for monitoring ink quality of the liquid ink. The printing system should especially be suitable for adjusting an ink recipe based on information of the liquid ink, preferably a printing system for automatically adjusting the ink recipe.

In order to achieve this object, a printing system is provided for printing on a material, comprising an ink formulation module comprising at least one ink reservoir and an ink adjustment system, a printing unit for applying ink to the material, a sensor module comprising at least one probe for generating color measurement data, and a control module being connected to the ink formulation module, the sensor module and the printing unit. The color measurement data comprises at least one ink color value of the ink before being applied on the material by the printing unit. The control module is configured to receive the color measurement data from the sensor module and to transmit an ink adjustment request to the ink formulation module, wherein the ink formulation module is configured to adjust the ink composition of the ink in the at least one ink reservoir based on the ink adjustment request.

The invention is based on the idea to provide information on the used ink in its liquid state, i.e. before being applied on the material, for adjusting the quality of the printing result. Further, the printing system can preferably be configured to adjust the ink within the at least one ink reservoir based on the color measurement data without the need of manual adjustment by well-trained personnel. Rather, the printing system according to the invention is adapted to automatically adjust the ink formulation based on the color measurement data by means of the ink adjustment request generated by the control module. This allows for dynamic ink formulation adjustment, faster set-up of printing processes and/or improved printing process stability.

With other words, the printing system according to the invention can be used for determining the quality of the ink in the at least one ink reservoir. This allows to identify falsely installed ink reservoirs and/or ink reservoirs comprising ink of low quality, thereby reducing waste and cost due to low-quality printed products.

Ink is understood previously and in the following to mean a composition comprising at least one base color, preferably a composition comprising a mixture of different base colors. These different base colors, and optionally additional solvents, are mixed together and result in the ink that is applied to the material. It goes without saying that the mixture of different base colors results again in a new color having color specific properties, for instance a color value.

The ink formulation module can be part of a color kitchen or can comprise a color kitchen. In the color kitchen, inks for special colors like pantone and/or HKS colors can be prepared by mixing e.g. process colors like cyan, magenta, yellow and/or black with additional colors for extending the available color space, e.g. orange, green and violet.

The color measurement data can be generated again after a pre-determined time interval to allow for a time-resolved adjustment of the ink formulation.

The color measurement data optionally includes the ink density.

Preferably, the control module comprises a computer-based module for mathematical calculation of the ink adjustment configured to create the ink adjustment request, thereby further reducing or eliminating the need of manual intervention of personnel in the process of adjusting the ink composition.

E.g., the computer-based module for mathematical calculation uses artificial intelligence and/or machine learning to create the ink adjustment request.

The computer-based module for mathematical calculation of the ink adjustment especially is configured to receive all data received by the control module and uses this data to create the ink adjustment request.

The control module especially is configured to create a database comprising the color measurement data and the ink adjustment request especially is calculated based on the data stored in the database.

With other words, the database provides information on the necessary ink adjustments, i.e. adjustments of the ink formulation, from a multitude of prior and/or current printing jobs. Especially in case the control module comprises a computer-based module for mathematical calculation of the ink adjustment, this allows for a reliable and automated generation of the ink adjustment request.

The current ink formulation, the ink adjustment request as well as the adjusted ink formulation can be stored in the database as a recipe template with a template identifier to facilitate data handling within the database.

The more information about ink formulations and ink adjustment requests are stored in the database, the more preferred is the use of the computer-based module for mathematical calculation of the ink adjustment in the control module, as e.g. machine learning algorithms are especially well suited to optimize parameters based on large datasets.

For characterizing the quality of the printing process and for creating the ink adjustment request, the control module can be configured to provide a quality parameter, in particular an actual $\Delta E$ value.

The ΔE value describes the distance in color space between two colors, as defined e.g. in DIN EN ISO 11664-4.

E.g., in case the color measurement data of the ink is described by a color value with the coordinates hue (h), saturation (s) and value (v), the distance between a current color value $C_c$ characterized by current coordinates $h_c$, $s_c$, and $v_c$ and a target color value $C_t$ ($h_t$, $s_t$, $v_t$) is given by the Euclidean distance in the coordinate space:

$$\Delta E=\sqrt{(h_c-h_t)^2+(s_c-s_t)^2+(v_c-v_t)^2}.$$

Hence, a value of ΔE=0 means that the distance in coordinate space between current color and target color is zero implying that the current color is the target color.

Since a value of ΔE=0 is a theoretical value and not achievable in the printing process, a value ΔE<1 is desirable for good printing quality. Preferably, ΔE is 0.6 or less.

The color measurement data can also be determined from multiple measurements. In this case, the determined ΔE values should preferably be reproducible with a difference of the ΔE values of 0.3 or less.

The ΔE value can also be determined by using the definition according to DIN EN ISO 11664-6, i.e. applying the formula for $\Delta E_{2000}$. In this variant, the complexity of the calculation is higher, but the obtained ΔE values have narrower tolerances.

For evaluating the color measurement data, all suitable color spaces can be used, e.g. also the colorspaces XYZ, xyY, L*a*b*, L*u*v* and/or u'v't*.

Suitable transformations between these color spaces can be used. E.g., in a first step, XYZ values are generated which are then converted in a second step to L*a*b* values when the color measurement data is being evaluated by the control module.

In a preferred embodiment, the control module is a cloud-based module. This allows to spatially separate the control module from the actual printing machine, comprising the ink formulation module, the printing unit and the sensor module.

E.g., multiple printing machines, each comprising an ink formulation module, a printing unit and a sensor module, can be connected to the same cloud-based module, which reduces the cost of the printing system and provides the control module with a higher number of color measurement data. In this way, the database created by the control module can have a higher information content, which preferably can be taken into account by the computer-based module for mathematical calculation of the ink adjustment module when creating the ink adjustment request.

Accordingly, it is possible that the cloud-based module is used to provide ink adjustment requests based on a multitude of otherwise independent printing machines. E.g., a multitude of printing machines located at a customer site are connected to a single cloud-based module operated by a supplier of the printing machines. This allows to provide ink adjustment requests by the supplier of the printing machine to the customer operating the printing machine, i.e. providing a color-management as a service, thereby reducing the waste produced by at least one of the printing machines and the costs for the printing jobs.

Further, the printing system according to the invention allows for a quality control of the inks installed with the ink reservoirs, i.e. the quality of the ink as delivered by an ink supplier. Inks which are received from an ink supplier but are not sufficiently similar to the desired ink formulation produce additional costs for the customer operating the printing machine, as the ink formulation needs additional adjustment. Such a case is easily determined based on the color measurement data and/or the ink adjustment request, which are especially determined in the cloud-based module based on the information obtained from a multitude of printing machines.

This also allows for easy implementation in an ink quality check procedure, e.g. based on statistical analysis of acceptable quality limit (AQL) procedures, and to easily identify charges of ink of lower and/or insufficient quality. In this way, further cost reduction in operating the printing system can be achieved by providing information which ink charges from which ink supplier comprises such ink.

The sensor module can comprise a probe assigned to the at least one ink reservoir, a probe assigned to an ink supply line connecting the ink formulation module with the printing unit and/or a probe assigned to a printing cylinder of the printing unit, especially an anilox roll of the printing unit. Accordingly, the at least one probe of the sensor module for generating the color measurement data can be positioned at different locations of the printing system, wherein the color measurement data is obtained before the ink is applied on the material.

The at least one probe is especially an optical sensing probe and the color measurement data especially comprises a remission spectrum of the ink. The remission spectrum, i.e. the spectrum resulting from the light scattered back from the ink, is well suited for characterizing the quality of the ink for the printing process.

The color measurement data especially comprises measurement data of the color spaces XYZ, xyY, L*a*b*, L*u*v* and/or u'v't*

Further, by taking the remission spectrum of the ink into account, cases of metamerism can easily be identified. Metamerism is the perceived matching of colors with differing remission spectra. The perceived matching is based on the fact that the impression received from a color is not only dependent on the color itself but also on the physical processes taking place in the human eye.

For measuring the remission spectrum, the at least one probe can have an integrated light source or the sensor module comprises an additional light source assigned to the at least one probe.

The integrated or additional light source preferably produces $D_{50}$ light, i.e. a light with a color temperature of essentially 5003 K. In principle, the produced light could be any standard illuminant.

The at least one probe can have a transparent cap. The transparent cap can prevent ink from accumulating on the probe. Further, the transparent cap can be used as measuring bell.

In one variant, the ink supply line comprises a measurement section, which preferably comprises a vision panel. The vision panel is transparent at least for light with the wavelength of the light source and/or of the expected remission spectrum. E.g., the vision panel is made of a borosilicate glass. In this variant, the at least one probe can be arranged outside of the ink supply line so that the at least one probe is not in direct contact with the ink. Therefore, there is no risk that ink accumulates on the probe.

In one variant, the sensor module comprises a probe for each of the inks used in the printing system. This allows for generating color measurement data for all inks at the same time. Further, this allows for a more flexible arrangement of the respective sensors.

The sensor module can further comprise a calibration device for calibration of the probe, e.g. based on a standard white of a ceramic plate of the calibration device.

Further, the ink adjustment system can comprise an auxiliary ink reservoir and a solvent reservoir. Accordingly, the ink adjustment system can be configured to adjust the ink composition in at least one ink reservoir associated to the auxiliary ink reservoir and the solvent reservoir with an auxiliary ink and/or a solvent based on the ink adjustment request.

Preferably, the ink adjustment system comprises an auxiliary ink reservoir for each of the ink reservoirs in the ink formulation module with each auxiliary ink reservoir associated to one of the ink reservoirs.

Preferably, a single solvent reservoir can be used for all ink reservoirs of the ink formulation module. However, the ink adjustment system can also comprise several solvent reservoirs associated to one or more of the ink reservoirs.

The auxiliary ink in the auxiliary ink reservoir and the solvent in the solvent reservoir must be compatible with the ink composition in the associated ink reservoir or ink reservoirs to allow for adjustment of the ink.

To further extend the amount of information about the printing process, the control module can be configured to further receive at least one ink color value of the ink after being applied on the material by the printing unit, especially before and/or after being dried on the material.

Accordingly, in addition to information on the ink before application, parameters after application can be used for evaluating the quality of the ink, too. This additional data can be stored in the database, too, which is especially preferable in case a computer-based module for mathematical calculation of the ink adjustment module is used for creating the ink adjustment request.

Also, the control module can be configured to correlate the ink before application and the ink after application. This allows to create an ink adjustment request to adjust the liquid ink such that it is appropriate to obtain the ink after application with the desired properties.

Further, the control module can be configured to receive unit parameters describing the printing unit. Unit parameters can be properties of the material and/or of the printing unit.

Unit parameters can be e.g. type of material, thickness of the material, surface roughness of the material, ink acceptance of the material, actual dot size of the ink on the material, actual ink layer thickness, actual absorbency value of the material, color information of the material, identification number of the printing unit, identifier of a component of the printing unit, in particular of a printing cylinder or an anilox roller, processing speed of the printing unit, gravure information of a printing cylinder or an anilox roller, e.g. gravure type (line, obtuse pyramid, hexagonal shape), number of cells in a certain volume, gravure depth of the cells and/or gravure angle, rotation speed of a printing cylinder or an anilox roller, circumference of a printing cylinder or an anilox roller offset between at least one printing cylinder and an anilox roll, information of a printing plate, e.g. thickness of the printing plate, hardness of the printing plate and/or screen ruling of the printing plate, e.g. in L/cm and/or L/inch, and/or information of the plate mounting tape, e.g. thickness in mm and/or Shore hardness of the plate mounting tape.

Unit parameters can also be related to information about the printed motif. E.g., prominent characteristics of the printed motif can be provided as catchword like 'high-contrast' and/or 'rim light'.

The unit parameters can be stored in the database and can be used in calculation of the ink adjustment request, too. This is especially preferable if the computer-based module for mathematical calculation of the ink adjustment is used in the control module to create the ink adjustment request and further increases the chance that the operation of the printing system is possible without manual adjustments at all.

Preferably, the printing system comprises a display connected to the control module, which is adapted to display the color measurement data. The display can also be a Human-Machine-Interface (HMI), e.g. a touchpad. In this way, a simple interface is created for providing information about the current state of the printing system. Accordingly, though the printing system according to the invention preferably operates automatically, personnel can easily check the current state of the printing system at any time and adjust any parameter of the printing system, if necessary.

Further, a warning message can be shown on the display if necessary, e.g. if the $\Delta E$ value is too large which can be an indicator of a wrongly installed ink reservoir and/or of an ink of low quality.

Further advantages and features will become apparent from the following description of the invention and from the appended Figures which show non-limiting exemplary embodiments of the invention and in which.

Figure 1:
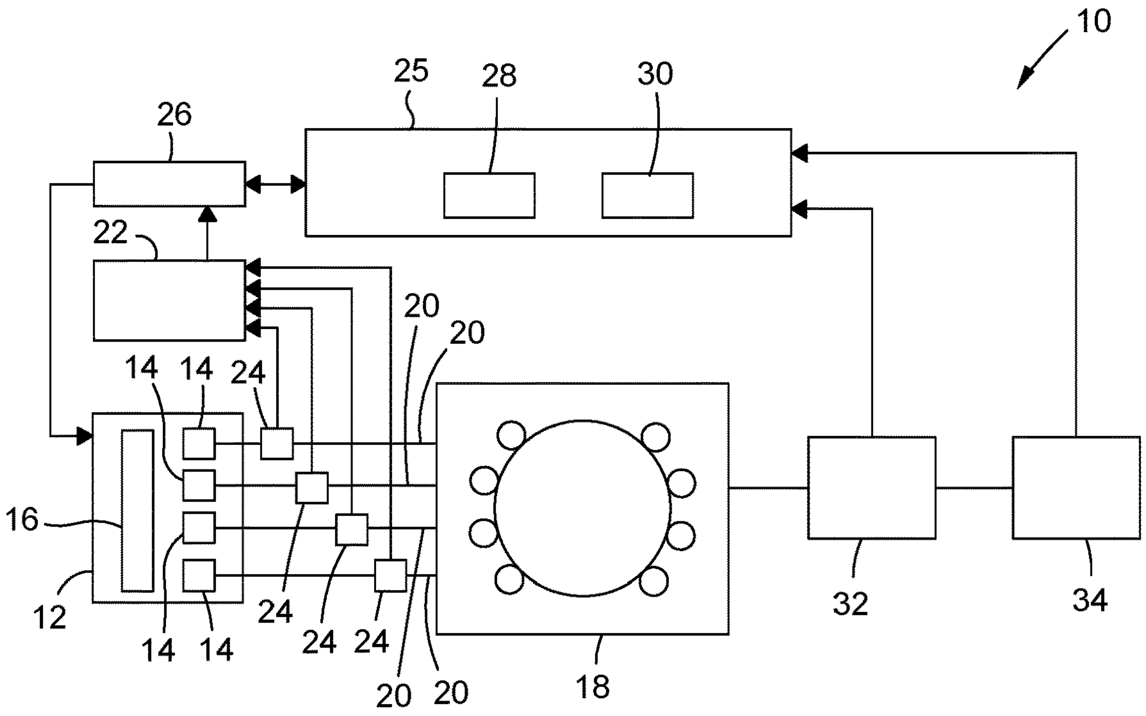
FIG. 1 shows a schematic representation of a first embodiment of the printing system according to the invention.

In FIG. 1, a first embodiment of the printing system 10 according to the invention is shown schematically.

The printing system 10 comprises an ink formulation module 12 with four ink reservoirs 14 to provide four inks for four-color printing, preferably in the CMYK color model. However, the printing system 10 could also have less or more than four ink reservoirs 14, e.g. eight ink reservoirs for eight-color printing.

The ink formulation module 12 further comprises an ink adjustment system 16 configured to adjust the ink formulation in each of the ink reservoirs 14.

The ink reservoirs 14 of the ink formulation module 12 are connected to a printing unit 18 by ink supply lines 20, wherein each ink reservoir 14 is associated to one of the ink supply lines 20.

The printing unit 18 is used to print the ink provided by the ink formulation module 12 on a material, e.g. on paper, cardboard or foil. It is to be understood that FIG. 1 is only illustrative in nature and that the printing unit 18 comprises several components as known in the art. E.g., the printing unit 18 is a flexographic printing unit or an intaglio-printing unit.

The printing system 10 further has a sensor module 22 which comprises four probes 24, wherein each of the probes 24 is associated to one of the ink supply lines 20. The probes 24 are connected by fiber optic cables to the sensor module 22.

The probes 24 are configured to provide color measurement data of the ink in the associated ink supply line 20 to the sensor module 22, wherein the color measurement data comprises at least one ink color value. Accordingly, the color measurement data comprises information about the inks before they are applied on the material in the printing unit 18.

The sensor module 22 is further connected to a control module 25 by means of a programmable logic controller 26.

However, the sensor module 22 could also be directly connected to the control module 25.

The connections between the sensor module 22, the control module 25 and the programmable logic controller 26 are established by an Ethernet connection or by a wireless connection.

Preferably, the control module 25 is a cloud-based module.

The control module 25 comprises an ink adjustment module 28 and a computer-based module 30 for mathematical calculation of the ink adjustment which are configured to provide an ink adjustment request based on the color measurement data received from the sensor module 22. The computer-based module 30 uses a machine learning algorithm to create the ink adjustment request.

The control module 25 is connected to the ink formulation module 12 by means of the programmable logic controller 26 and is configured to transmit the ink adjustment request to the ink formulation module 12.

Based on the ink adjustment request, the ink adjustment system 16 adjusts at least one of the inks in the ink reservoirs 14.

Additionally, the printing system 10 shown in FIG. 1 comprises an inline measurement module 32 for providing ink color values of the ink in a wet state after being applied on the material by the printing unit 18 and/or to provide unit parameters describing the printing unit 18. The unit parameters can in principle also be supplied by the printing unit 18 itself.

Further, the printing system 10 comprises a control station 34 for providing ink color values of the dry ink after application on the material.

The inline measurement module 32 and the control station 34 are connected to the control module 25 and configured to transmit the ink color values and/or unit parameters to the control module 25.

Figure 2:
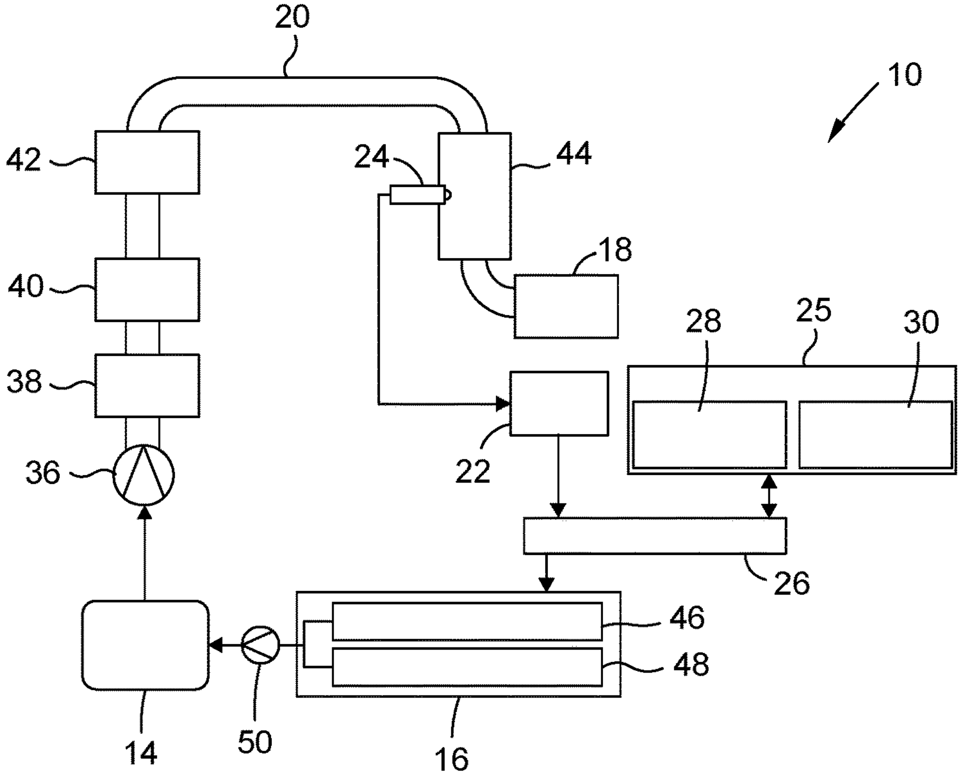
FIG. 2 shows selected parts of the printing system of FIG. 1.

In FIG. 2, selected parts of the printing system 10 are shown in more detail.

In FIG. 2, only one of the ink reservoirs 14 is shown for simplification. The ink reservoir 14 is e.g. an ink bucket. The ink bucket e.g. has a volume in the range of from 20 to 40 L, especially with a volume of 30 L. Of course, the ink bucket could have any volume suitable for the printing system 10 at hand.

The ink in the ink reservoir 14 is transferred by a first pump 36 to the ink supply line 20 associated to the ink reservoir 14. To homogenize the flow speed of the ink in the ink supply line 20, a damper 38 is arranged downstream of the first pump 36 in the ink supply line 20. Further, a temperature unit 40 for temperature adjustment of the ink and a viscosity control unit 42 for adjusting the viscosity of the ink are arranged downstream of the damper 38 in the ink supply line 20.

The ink supply line 20 comprises a measurement section 44 in which the probe 24 extends into the ink supply line 20. The probe 24 is an optical sensing probe adapted to measure a remission spectrum of the ink flowing through the ink supply line 20. The probe 24 is impermeable for ink to prevent damages to the probe due to interaction with the ink.

Of course, FIG. 2 is illustrative in nature, only. The probe 24 and the measurement section 44 can be located at any position which allows reliable measurement of the ink. E.g., the position of the probe 24 and the measurement section 44 can be chosen such to minimize deviations in the temperature of the ink.

In the embodiment shown in FIG. 2, the probe 24 comprises an integrated light source for producing $D_{50}$ light. In principle, any standard illuminant could be used, e.g. $D_{65}$ light.

The $D_{50}$ light is emitted into the ink to obtain the remission spectrum of the ink by the probe 24 from which information about the ink in the colorspace XYZ, xyY, L*a*b*, L*u*v* and/or u'v't* can be calculated.

As schematically shown in FIG. 2, the probe 24 is aligned perpendicular to the flow direction of the ink within the ink supply line 20. This arrangement can prevent the formation of air bubbles in front of the probe 24.

The probe 24 is adapted to transmit the remission spectrum of the ink as color measurement data to the sensor module 22 by a fiber optic cable.

The color measurement data is then transmitted to the control module 25 by means of the programmable logic controller 26.

As explained before, the control module 25 generates an ink adjustment request based on the color measurement data.

The ink adjustment request is generated based on an actual $\Delta E$ value, i.e. based on the Euclidean distance in color space between the target ink color and the ink color corresponding to the color measurement data, as defined e.g. in DIN EN ISO 11664-4 or DIN EN ISO 11664-6.

However, further information can be taken into account when generating the ink adjustment request, e.g. the ink density. Additionally, unit parameters and/or ink color values of the ink after being applied on the material and submitted by the inline measurement module 32 and/or the control station 34 can use for generating the ink adjustment request.

To further optimize this process, the ink adjustment module 28 can build up a database in which all parameters usable for generating the ink adjustment request are stored and can be taken into account in subsequent iterations of optimizing the ink composition and/or for generating the ink adjustment process in future printing processes.

The database can especially be assessed by the computer-based module 30 to automatically find an optimal ink adjustment request without any manual adjustment of personnel.

The ink adjustment request is then transmitted to the ink adjustment system 16 of the ink formulation module 12.

The ink adjustment system 16 comprises an auxiliary ink reservoir 46 and a solvent reservoir 48. By means of a second pump 50, ink from the auxiliary ink reservoir 46 and/or solvent from the solvent reservoir 48 can be pumped into the ink reservoir 14 to adjust the ink stored in the ink reservoir 14.

The auxiliary ink reservoir 46 typically has a volume much lower than the volume of the ink reservoir 14, e.g. a volume in the range of from 1 to 10 L, especially a volume of 5 L.

With other words, the ink adjustment request received from the control module provides the ink adjustment system 16 with the information which amount of ink and/or solvent must be applied to the ink reservoir 14 to optimize the ink composition in the ink reservoir 14.

Accordingly, the printing system 10 allows to automatically adjust the ink composition based on information of the liquid ink in an easy way, thereby reducing waste and downtime of the printing system 10 and providing a consistent high quality print.

Figure 3:
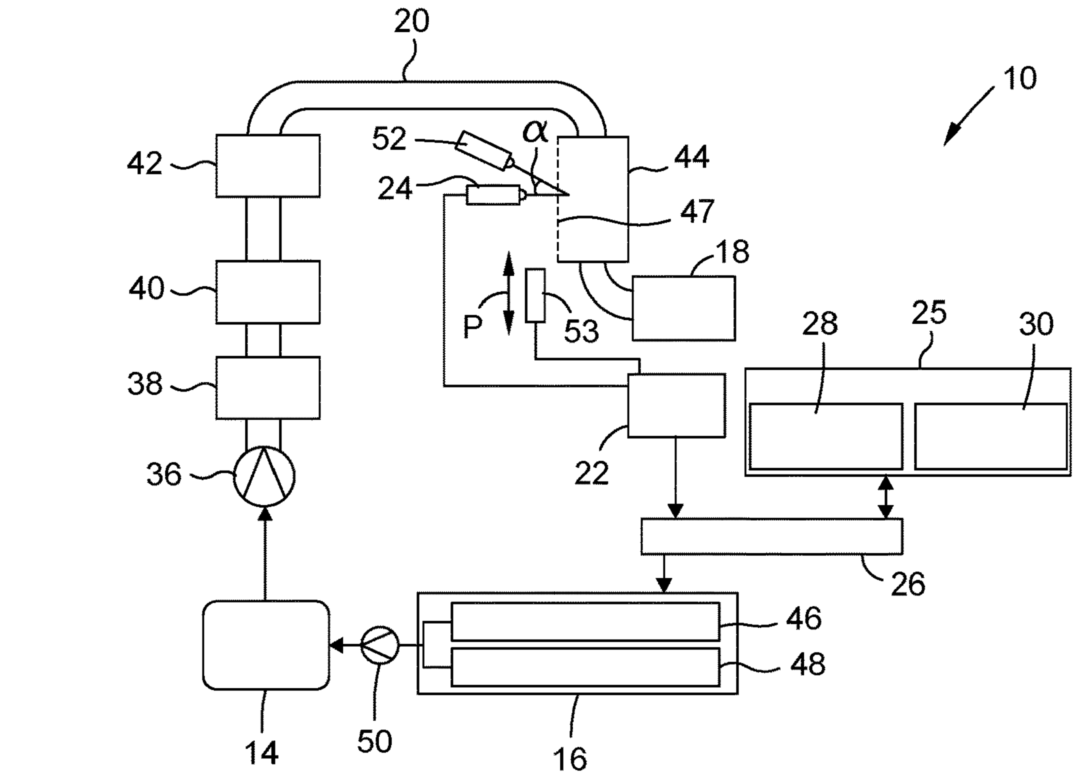
FIG. 3 shows selected parts of a second embodiment of the printing system according to the invention.

In FIG. 3, a second embodiment of the printing system 10 is shown schematically. The second embodiment essentially corresponds to the first embodiment so that only differences between the first and the second embodiment will be discussed in the following. Identical and functionally identical components are provided with the same reference signs.

In the second embodiment, the probe 24 is arranged outside of the ink supply line 20 close to the measurement section 44. Further, the probe 24 does not have an integrated light source, but an additional light source 52 is provided by the sensor module 22, wherein the probe 24 and the additional light source 52 are arranged at an angle α relative to each other. In the shown embodiment, the angle α is in the range of 10 to 35°, for example 20°.

The measurement section 44 further comprises a vision panel 47 which is transparent at least for the wavelengths of the light provided by the light source 52 and of the remission spectrum of the ink flowing through the measurement section 44 of the ink supply line 20. E.g., the vision panel 47 is out of borosilicate glass.

In this embodiment, the probe 24 does not have direct contact with the ink. Accordingly, there is no risk that ink accumulates on the probe 24 and the probe 24 does need to be impermeable for the ink so that cheaper probes 24 can be used. Further, no additional turbulences are generated in the flowing ink, as there is no interaction with the probe 24.

Further, the sensor module 22 comprises a calibration device 53. The calibration device 53 is movable as indicated by the double-arrow P in FIG. 2. Accordingly, the calibration device 53 can be moved to a position for calibration of the probe 24.

Figure 4:
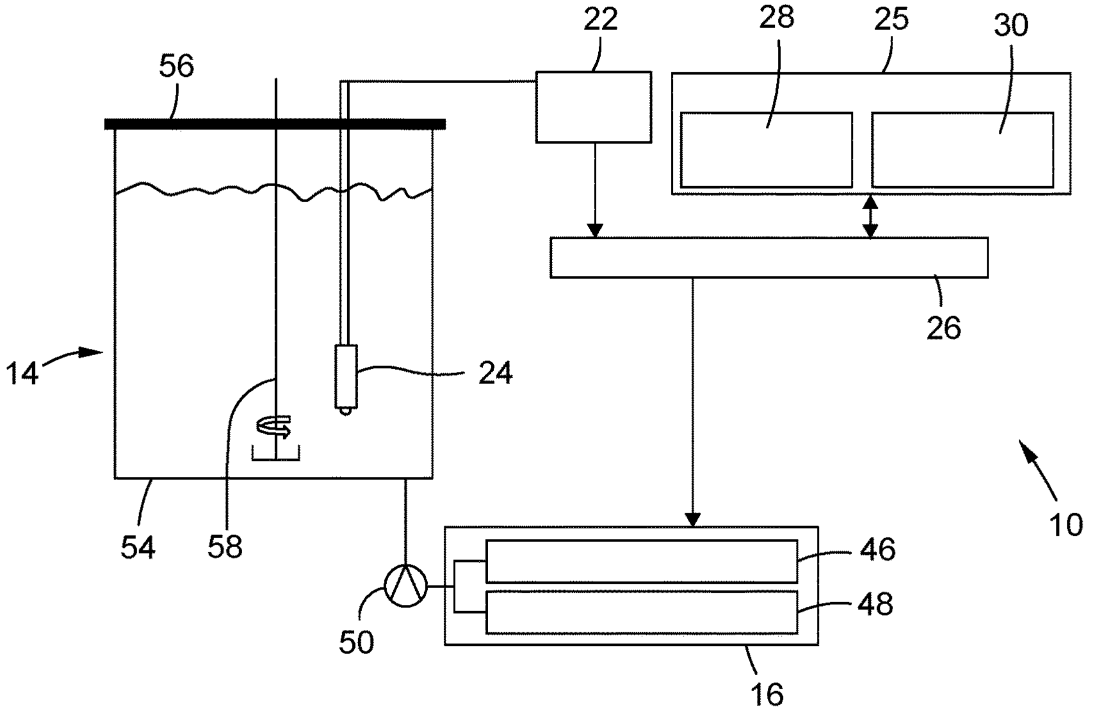
FIG. 4 shows selected parts of a third embodiment of the printing system according to the invention.

In FIG. 4, a third embodiment of the printing system 10 is shown schematically. The third embodiment essentially corresponds to the first and second embodiment so that only differences will be discussed in the following. Identical and functionally identical components are provided with the same reference signs.

In the third embodiment, the probe 24 is arranged within the ink reservoir 14 and has an integrated light source.

More specifically, in FIG. 4 it can be seen that the ink reservoir 14 is an ink bucket 54 closed by a lid 56. A stirrer 58 extends through the lid 56 and is used to homogenize the ink provided in the ink bucket 54 by stirring.

Similar to the stirrer 58, the probe 24 extends through the lid 56 into the ink.

In this embodiment, the probe 24 could also comprise a means for detection of the ink level in the ink reservoir 14, e.g. a capacity sensor, an infrasound sensor, a microwave sensor and/or a sensor for measuring the hydrostatic pressure. The additional means for detection of the ink level could also be separate from the probe 24.

Figure 5:
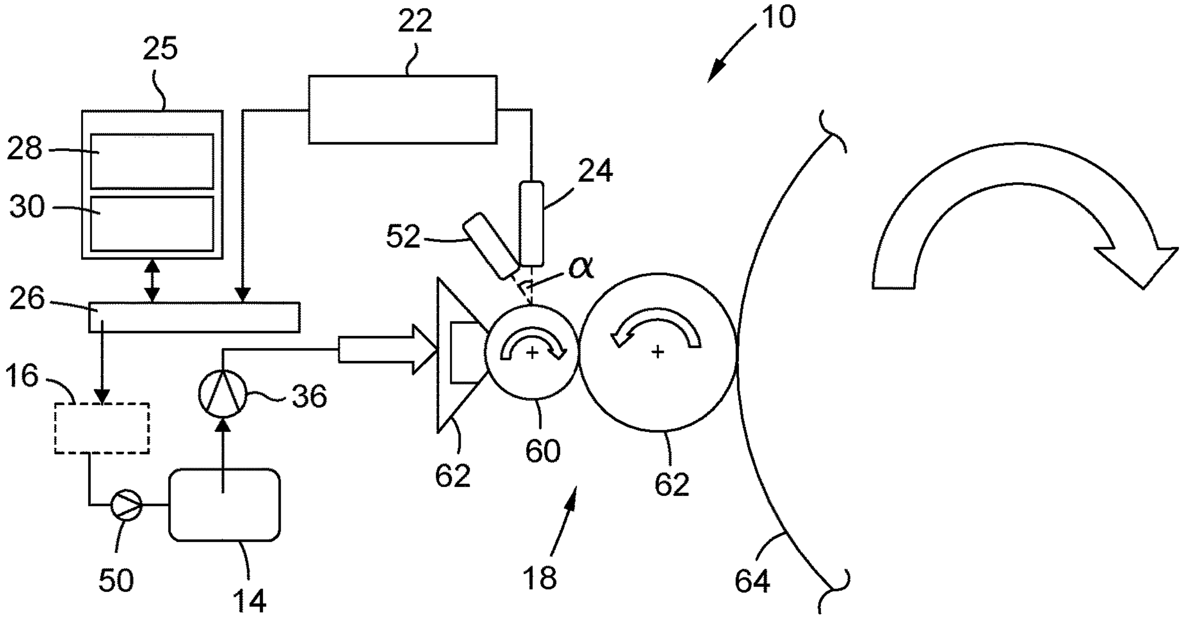
FIG. 5 shows selected parts of a fourth embodiment of the printing system according to the invention.

In FIG. 5, a fourth embodiment of the printing system 10 is shown schematically. The fourth embodiment essentially corresponds to the above described embodiments so that only differences will be discussed in the following. Identical and functionally identical components are provided with the same reference signs.

In the fourth embodiment, the probe 24 is associated to the printing unit 18. Specifically, the probe 24 is arranged next to an anilox roll 60 of the printing unit 18. Ink is supplied on the anilox roll 60 by means of a chamber doctor blade 62 as known in the art.

Accordingly, in the fourth embodiment, the probe 24 collects color measurement data of the ink while the ink is provided in gravures of the anilox roll 60 but before the ink is transferred from the anilox roll 60 to a printing plate mounted on a plate cylinder 62 and accordingly before the ink is supplied from the plate cylinder 62 on the material provided on an impression cylinder 64.

It should be clear that the printing system 10 could also comprise a multitude of probes 24, preferably arranged at different parts of the printing system 10. While this increases the complexity and the cost of the printing system 10, such an embodiment further increases the amount of information about the printing system 10 taken into account by the control module 25 when generating the ink adjustment request, thereby increasing the chance of successfully find an optimal ink formulation without any intervention of personnel.

The invention claimed is:

1. A printing system for printing on a material, the printing system comprising:

an ink formulation module comprising at least one ink reservoir and an ink adjustment system, a printing unit for applying ink to the material, a sensor module comprising at least one probe for generating color measurement data of the ink in an ink supply line before ink is applied on the material by the printing unit, wherein the at least one probe is assigned to a measurement section that is upstream of and in proximity to the printing unit and downstream of a first pump, a damper, a temperature unit, and a viscosity control unit, the ink supply line connecting the ink formulation module with the printing unit, and a control module being connected to the ink formulation module, the sensor module, and the printing unit, wherein the color measurement data comprises at least one ink color value of the ink as detected by the at least one probe before being applied on the material by the printing unit, wherein the control module is configured to receive the color measurement data from the sensor module and to transmit an ink adjustment request to the ink formulation module, and wherein the ink formulation module is configured to adjust an ink composition of the ink in the at least one ink reservoir based on the ink adjustment request.

2. The printing system according to claim 1, wherein the control module comprises a computer-based module for mathematical calculation of the ink adjustment configured to create the ink adjustment request.

3. The printing system according to claim 1, wherein the control module is configured to create a database comprising the color measurement data and the ink adjustment request is calculated based on the data stored in the database.

4. The printing system according to claim 1, wherein the control module is configured to provide a quality parameter for characterizing the quality of the printing process and for creating an ink reformulation request.

5. The printing system according to claim 1, wherein the control module is a cloud-based module.

6. The printing system according to claim 1, wherein the sensor module further comprises a probe assigned to the at least one ink reservoir and a probe assigned to an anilox roller of the printing unit.

7. The printing system according to claim 1, wherein the at least one probe is an optical sensing probe and the color measurement data comprises a remission spectrum of the ink.

8. The printing system according to claim 1, wherein the probe has a transparent cap.

9. The printing system according to claim 1, wherein the sensor module comprises a probe for each of the inks used in the printing system.

10. The printing system according to claim 1, wherein the ink adjustment system comprises an auxiliary ink reservoir and a solvent reservoir.

11. The printing system according to claim 1, wherein the control module is configured to further receive at least one ink color value of the ink after being applied on the material by the printing unit.

12. The printing system according to claim 1, wherein the control module is configured to further receive unit parameters describing the printing unit.

13. The printing system according to claim 1, wherein the printing system comprises a display connected to the control module and which is adapted to display the color measurement data.

14. The printing system according to claim 1, wherein the measurement section includes a vision panel, wherein the sensor module includes an additional light source, and wherein both the sensor and the additional light source are outside the measurement section.

15. The printing system according to claim 14, wherein the additional light source is arranged at an angle relative to the probe, and the angle is between 10 degrees and 35 degrees.

16. The printing system according to claim 1, wherein the damper is arranged on the ink supply line downstream from the first pump and upstream from the measurement section, wherein the damper is configured to homogenize a flow speed of the ink in the ink supply line.

17. The printing system according to claim 16, wherein the temperature unit is arranged on the ink supply line downstream from the damper and upstream from the measurement section, wherein the temperature unit is configured to adjust a temperature of the ink within the ink supply line.

18. The printing system according to claim 17, wherein the viscosity control unit is arranged on the ink supply line downstream from the temperature unit and upstream from the measurement section, wherein the viscosity control unit is configured to adjust a viscosity of the ink within the ink supply line.

19. A printing system for printing on a material, the printing system comprising:

an ink formulation module comprising at least one ink reservoir and an ink adjustment system;

a printing unit for applying ink to the material, the printing unit including an anilox roller, a plate cylinder, and an impression cylinder;

a sensor module associated with the printing unit, the sensor module including at least one probe assigned to the anilox roller for generating color measurement data, and a control module being connected to the ink formulation module, the sensor module, and the printing unit, wherein the color measurement data comprises at least one ink color value of the ink as detected by the at least one probe after the ink is applied to the anilox roller, before the ink is transferred from the anilox roller to a printing plate mounted on the plate cylinder, and before the ink is applied on the material by the printing unit, wherein the control module is configured to receive the color measurement data from the sensor module and to transmit an ink adjustment request to the ink formulation module, and wherein the ink formulation module is configured to adjust an ink composition of the ink in the at least one ink reservoir based on the ink adjustment request.

20. A printing system for printing on a material, the printing system comprising:

an ink formulation module comprising at least one ink reservoir and an ink adjustment system;

a printing unit for applying ink to the material, the printing unit including an anilox roller, a plate cylinder, and an impression cylinder;

a sensor module associated with the printing unit, the sensor module including at least a first probe assigned to the anilox roller for generating color measurement data and at least a second probe assigned to a measurement section that is upstream of and in proximity to the printing unit and the first probe, and downstream of a first pump, a damper, a temperature unit, and a viscosity control unit, and a control module being connected to the ink formulation module, the sensor module, and the printing unit, wherein the color measurement data comprises at least one ink color value of the ink as detected by the first probe after the ink passes the second probe and before the ink is transferred from the anilox roller to a printing plate mounted the plate cylinder, wherein the color measurement data comprises at least one ink color value of the ink as detected by the second probe after the ink passes a first pump, a damper, a temperature unit, and a viscosity control unit, and before the ink passes the first probe, wherein the control module is configured to receive the color measurement data from the sensor module and to transmit an ink adjustment request to the ink formulation module, and wherein the ink formulation module is configured to adjust an ink composition of the ink in the at least one ink reservoir based on the ink adjustment request.

* * * * *